US010960346B2

(12) United States Patent
Tanaka et al.

(10) Patent No.: US 10,960,346 B2
(45) Date of Patent: Mar. 30, 2021

(54) COMPOSITE AMINE ABSORBING SOLUTION, AND DEVICE AND METHOD FOR REMOVING CO2 OR H2S OR BOTH

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 0 days.

(21) Appl. No.: 16/322,364

(22) PCT Filed: Jan. 30, 2018

(86) PCT No.: PCT/JP2018/002962

§ 371 (c)(1),
(2) Date: Jan. 31, 2019

(87) PCT Pub. No.: WO2018/143192

PCT Pub. Date: Aug. 9, 2018

(65) Prior Publication Data

US 2019/0151794 A1 May 23, 2019

(30) Foreign Application Priority Data

Jan. 31, 2017 (JP) ............................ JP2017-016147

(51) Int. Cl.
*B01D 53/14* (2006.01)
*B01D 53/18* (2006.01)
(Continued)

(52) U.S. Cl.
CPC ..... *B01D 53/1493* (2013.01); *B01D 53/1425* (2013.01); *B01D 53/1462* (2013.01);
(Continued)

(58) Field of Classification Search
None
See application file for complete search history.

(56) References Cited

U.S. PATENT DOCUMENTS 5,904,908 A 5/1999 Suzuki et al.
2007/0283813 A1 12/2007 Iijima et al.
(Continued)

FOREIGN PATENT DOCUMENTS

GB 2167397 A 5/1986
JP S61-136421 A 6/1986
(Continued)

OTHER PUBLICATIONS

First Examination Report in corresponding Indian Application No. 201917003166, dated Dec. 27, 2019 (6 pages).
(Continued)

*Primary Examiner* — Daniel Berns
(74) *Attorney, Agent, or Firm* — Osha Bergman Watanabe & Burton LLP

(57) ABSTRACT

The composite amine absorbing solution according to the present invention absorbs $CO_2$ or $H_2S$ or both in a gas, and is obtained by dissolving a linear monoamine, a diamine, and an amide group-containing compound in water. By adopting this composite amine absorbing solution, the composites are interacting in a composite manner, due to an integrated effect of the components, the absorption property of $CO_2$ or $H_2S$ or both is favorable, the desorption properties of the $CO_2$ or $H_2S$ absorbed when regenerating the absorbing solution become favorable, and the amount of steam from a reboiler used when regenerating the absorbing solution in a $CO_2$ recovery device can be reduced.

8 Claims, 8 Drawing Sheets

(51) Int. Cl.

| | |
|---|---|
| ***B01D 53/52*** | (2006.01) |
| ***B01D 53/62*** | (2006.01) |
| ***B01D 53/78*** | (2006.01) |
| ***C01B 17/16*** | (2006.01) |
| ***C01B 32/50*** | (2017.01) |

(52) U.S. Cl.

CPC ..... *B01D 53/1468* (2013.01); *B01D 53/1475* (2013.01); *B01D 53/18* (2013.01); *B01D 53/52* (2013.01); *B01D 53/62* (2013.01); *B01D 53/78* (2013.01); *C01B 17/16* (2013.01); *C01B 32/50* (2017.08); *B01D 2252/2041* (2013.01); *B01D 2252/2053* (2013.01); *B01D 2252/20405* (2013.01); *B01D 2252/20421* (2013.01); *B01D 2252/20426* (2013.01); *B01D 2252/20431* (2013.01); *B01D 2252/20436* (2013.01); *B01D 2252/20447* (2013.01); *B01D 2252/20484* (2013.01); *B01D 2252/20489* (2013.01); *B01D 2252/504* (2013.01); *Y02C 20/40* (2020.08); *Y02P 20/151* (2015.11)

(56) References Cited

U.S. PATENT DOCUMENTS

| | | | |
|---|---|---|---|
| 2010/0180764 | A1 | 7/2010 | Inoue et al. |
| 2013/0011314 | A1 | 1/2013 | Porcheron et al. |
| 2014/0234192 | A1 | 8/2014 | Hirata et al. |
| 2015/0132207 | A1 | 5/2015 | Tanaka et al. |
| 2015/0290580 | A1 | 10/2015 | Grandjean et al. |

FOREIGN PATENT DOCUMENTS

| | | | | |
|---|---|---|---|---|
| JP | H07-051537 | A | 2/1995 | |
| JP | H09-253446 | A | 9/1997 | |
| JP | 2008-013400 | A | 1/2008 | |
| JP | 2008-307519 | A | 12/2008 | |
| JP | 4690659 | B2 | 6/2011 | |
| JP | 2013-86079 | A | 5/2013 | |
| JP | 2013-236987 | A | 11/2013 | |
| JP | 2015/27647 | A | 2/2015 | |
| WO | 2011-018479 | A1 | 2/2011 | |
| WO | 2011-121635 | A1 | 10/2011 | |
| WO | WO-2011121635 | A1 * | 10/2011 | ......... B01D 53/1475 |

OTHER PUBLICATIONS

International Search Report and Written Opinion in corresponding International Application No. PCT/JP2018/002962, dated Mar. 13, 2018 (14 pages).

Extended European Search Report issued in corresponding European Application No. 18748673.3, dated Sep. 18, 2019 (6 pages).

* cited by examiner

12
BOILER
13
14
13a
13b
14
22
16
15
C.W
14
18B
23
18
*1
21
17
18A
C.W
33
32
24
19
25
19
17
20
28
29
C.W
40
35
30
31
*1
41
C.W
42
43
26
27
30
34

COMPOSITE AMINE ABSORBING SOLUTION, AND DEVICE AND METHOD FOR REMOVING CO2 OR H2S OR BOTH

TECHNICAL FIELD

The present invention relates to a composite amine absorbing solution, and a device and a method for removing $CO_2$ or $H_2S$ or both.

BACKGROUND ART

In recent years, as one of causes for a global warming phenomenon, a greenhouse effect by $CO_2$ has been pointed out, and a countermeasure therefor has become an international urgent task in order to protect a global environment. $CO_2$ sources range all fields of human activity that combust a fossil fuel and a demand for suppressing $CO_2$ emissions tends to be further intensifying. Accordingly, active research is underway regarding a method for removing and recovering $CO_2$ in a combustion exhaust gas from a boiler by bringing the combustion exhaust gas into contact with an amine-based $CO_2$ absorbing solution and a method for storing recovered $CO_2$ without desorbing the $CO_2$ to the atmosphere for power generation facilities such as a thermal power station in which a large amount of a fossil fuel is used. In addition, as a step of removing and recovering $CO_2$ from a combustion exhaust gas using a $CO_2$ absorbing solution as described above, a step in which the combustion exhaust gas and the $CO_2$ absorbing solution are brought into contact with each other in an absorption tower, the absorbing solution that has absorbed $CO_2$ is heated in a regeneration tower, and the absorbing solution is regenerated while desorbing $CO_2$, circulated again to the absorption tower, and reused is employed (for example, refer to PTL 1).

In a method for absorbing, removing, and recovering $CO_2$ from a $CO_2$-containing gas such as a combustion exhaust gas using the $CO_2$ absorbing solution and the step, the step is additionally installed in a combustion facility, and thus it is necessary to reduce the operation cost as much as possible. Particularly, in the step, a regeneration step consumes a large amount of heat energy, and thus it is necessary to develop the step as an energy-saving process as much as possible.

Therefore, in the related art, for example, there has been a proposal of extracting some of a semi-lean solution to the outside from a regeneration tower, exchanging heat with a lean solution using a heat exchanger, subsequently, exchanging heat with steam-condensed water using the heat exchanger, returning the semi-lean solution to a lower section side of the extraction location, and increasing a temperature of the semi-lean solution being supplied to the lower section side of the regeneration tower, thereby reducing the steam consumption amount (for example, refer to PTL 2 (Example 8 and FIG. 17)).

Meanwhile, in order to improve the performance of the $CO_2$ absorbing solution, there have been proposals of an absorbing solution that contributes to the improvement of the absorption performance (PTL 3 to 5).

CITATION LIST

Patent Literature

[PTL 1] Japanese Unexamined Patent Application Publication No. 7-51537

[PTL 2] Japanese Patent No. 4690659

[PTL 3] Japanese Unexamined Patent Application Publication No. 2008-13400

[PTL 4] Japanese Unexamined Patent Application Publication No. 2008-307519

[PTL 5] Japanese Unexamined Patent Application Publication No. 2013-236987

SUMMARY OF INVENTION

Technical Problem

Meanwhile, not only the absorption performance of the $CO_2$ absorbing solution but also the desorption capacity when regenerating the absorbing solution are important, but a proposal of an absorbing solution having a favorable regeneration performance as well as an improved absorption performance, which has been frequently studied in the related art, is still an unachieved object.

Therefore, there is a strong demand for the development of an absorbing solution having not only favorable absorption capacity but also excellent regeneration capacity in order to achieve an energy-saving performance enabling the desired $CO_2$ recovery amount with less steam consumption for the purpose of reducing the operation cost since, in the recovery of $CO_2$ from an exhaust gas, steam is necessary for regenerating the absorbing solution as described above.

The present invention has been made in consideration of the above-described problem, and an object of the present invention is to provide a composite amine absorbing solution having not only favorable absorption capacity but also excellent regeneration capacity and a device and a method for removing $CO_2$ or $H_2S$ or both.

Solution to Problem

A first invention of the present invention for solving the above-described problem is a composite amine absorbing solution which is an absorbing solution that absorbs $CO_2$ or $H_2S$ or both in a gas and is obtained by dissolving in water (1) a linear monoamine, (2) a diamine, and (3) an amide group-containing compound.

A second invention is the composite amine absorbing solution according to the first invention, in which the linear monoamine (1) includes at least one of a primary linear monoamine, a secondary linear monoamine, and a tertiary linear monoamine.

A third invention is the composite amine absorbing solution according to the first or second invention, in which the diamine (2) includes at least one of a primary linear polyamine, a secondary linear polyamine, and a cyclic polyamine.

A fourth invention is the composite amine absorbing solution according to any one of the first to third inventions, in which a total concentration of the linear monoamine (1) and the diamine (2) is 40% to 60% by weight of the entire absorbing solution.

A fifth invention is the composite amine absorbing solution according to any one of the first to fourth inventions, in which a blending ratio ((the diamine and the amide group-containing compound)/the linear monoamine) of the diamine (2) and the amide group-containing compound (3) with respect to the linear monoamine (1) is 0.16 to 2.1.

A sixth invention is the composite amine absorbing solution according to any one of the first to fifth inventions, in which a blending ratio between the diamine (2) and the amide group-containing compound (3) is 1:0.4 to 1:54.

A seventh invention is a device for removing $CO_2$ or $H_2S$ or both including an absorption tower that brings a gas containing $CO_2$ or $H_2S$ or both and an absorbing solution into contact with each other to remove $CO_2$ or $H_2S$ or both and an absorbing solution regeneration tower that regenerates a solution that has absorbed $CO_2$ or $H_2S$ or both, in which a solution regenerated by removing $CO_2$ or $H_2S$ or both in the absorbing solution regeneration tower is reused in the absorption tower, and the composite amine absorbing solution according to any one of the first to sixth inventions is used.

An eighth invention is the device for removing $CO_2$ or $H_2S$ or both according to the seventh invention, in which an absorbing temperature in the absorption tower is 30° C. to 80° C., and a regeneration temperature in the absorbing solution regeneration tower is 110° C. or higher.

A ninth invention is a method for removing $CO_2$ or $H_2S$ or both, in which a gas containing $CO_2$ or $H_2S$ or both and an absorbing solution are brought into contact with each other to remove $CO_2$ or $H_2S$ or both in an absorption tower, a solution that has absorbed $CO_2$ or $H_2S$ or both is regenerated in an absorbing solution regeneration tower, a solution regenerated by removing $CO_2$ or $H_2S$ or both in the absorbing solution regeneration tower is reused in the absorption tower, and $CO_2$ or $H_2S$ or both is removed using the composite amine absorbing solution according to any one of the first to sixth inventions.

A tenth invention is the method for removing $CO_2$ or $H_2S$ or both according to the ninth invention, in which an absorbing temperature in the absorption tower is 30° C. to 80° C., and a regeneration temperature in the absorbing solution regeneration tower is 110° C. or higher.

Advantageous Effects of Invention

According to the present invention, an absorbing solution is obtained by dissolving in water (1) a linear monoamine, (2) a diamine, and (3) an amide group-containing compound, whereby the composites are interacting in a composite manner, due to an integrated effect of the components, the absorption property of $CO_2$ or $H_2S$ or both is favorable, the desorption properties of the $CO_2$ or $H_2S$ absorbed when regenerating the absorbing solution become excellent, and the consumption of steam used when regenerating the absorbing solution in a $CO_2$ recovery facility can be reduced.

DESCRIPTION OF EMBODIMENTS

Figure 1:
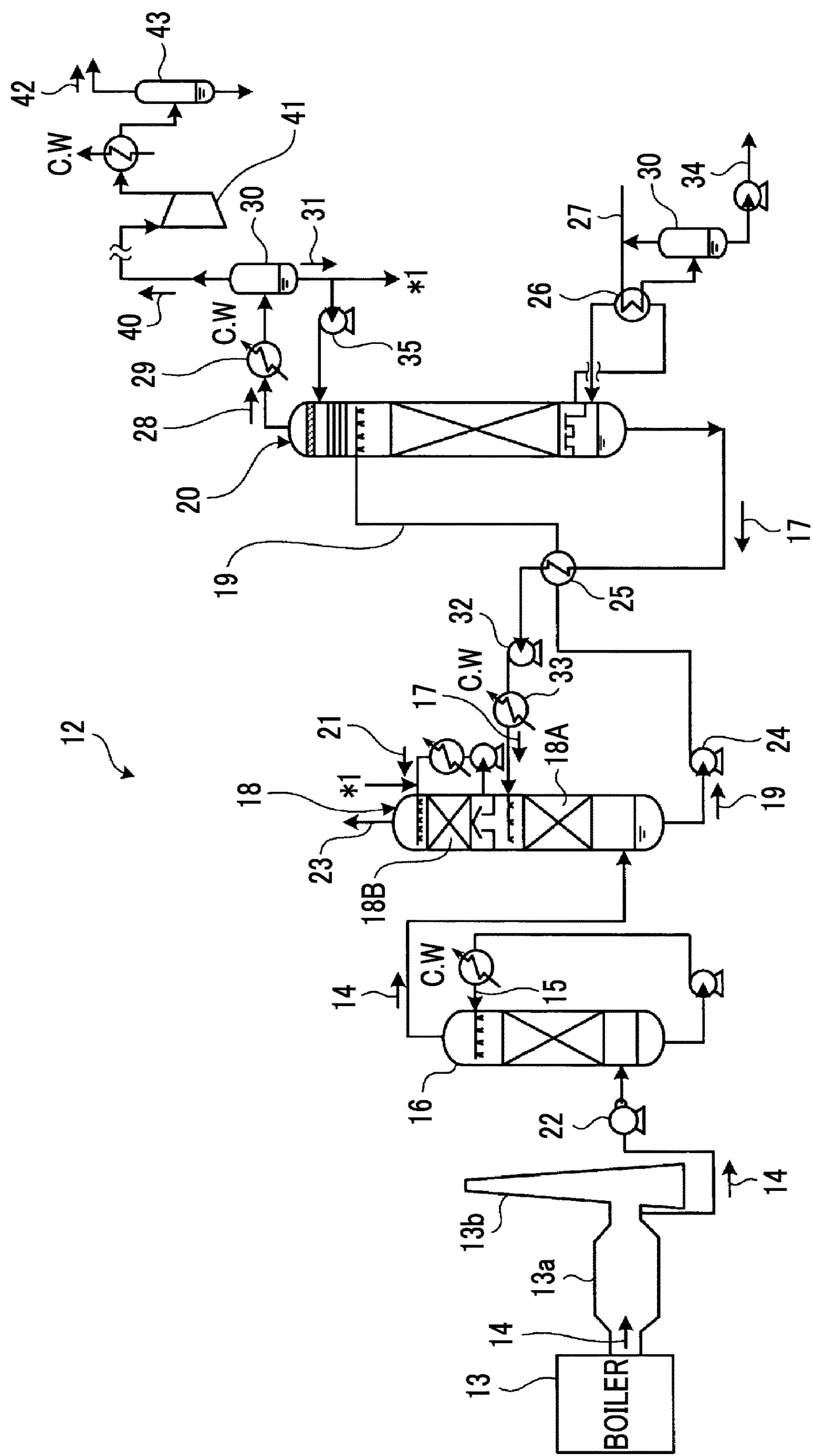
FIG. 1 is a schematic diagram illustrating a constitution of a $CO_2$ recovery device according to Example 1.

Hereinafter, preferred examples of the present invention will be described in detail with reference to the accompanying drawings. Meanwhile, the present invention is not limited by the examples, and, in a case in which there is a plurality of examples, an article constituted by combining the respective examples is also included in the scope of the present invention.

Example 1

A composite amine absorbing solution according to an example of the present invention is an absorbing solution that absorbs $CO_2$ or $H_2S$ or both in a gas and is obtained by dissolving in water (c component) (1) a linear monoamine (a component), (2) a diamine (b component), and (3) an amide group-containing compound (d component). In the present invention, the absorbing solution is obtained by dissolving in water the linear monoamine (1), the diamine (2), and the amide group-containing compound (3), whereby the composites are interacting in a composite manner, due to an integrated effect of the components, the absorption property of $CO_2$ or $H_2S$ or both is favorable, the desorption properties of the $CO_2$ or $H_2S$ absorbed when regenerating the absorbing solution become excellent, and the consumption of steam used when regenerating the absorbing solution in a $CO_2$ recovery facility can be reduced.

Here, the linear monoamine includes at least one of a primary linear monoamine, a secondary linear monoamine, and a tertiary linear monoamine. In addition, the linear monoamine may be a two-component linear amine combination of a primary linear monoamine and a secondary linear monoamine, a two-component linear amine combination of a primary linear monoamine and a tertiary linear monoamine, and, furthermore, a three-component linear amine combination of a primary linear monoamine, a secondary linear monoamine, and a tertiary linear monoamine.

In addition, as the primary linear monoamine, an amine having a high steric hindrance or an amine having a low steric hindrance is preferred. Here, in the primary linear monoamine, as the amine having a low steric hindrance, for example, at least one selected from monoethanolamine (MEA), 3-amino-1-propanol, 4-amino-1-butanol, and diglycolamine can be exemplified. Meanwhile, the above-described compounds may be combined together.

In addition, in the primary linear monoamine, as the primary monoamine having a high steric hindrance, a compound represented by Chemical Formula (1) illustrated below with a title "Chem 1" is preferred.

[Chem 1]

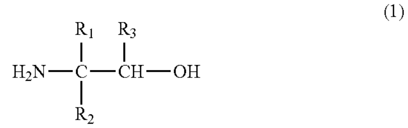

(1)

$R_1$ to $R_3$: H or hydrocarbon group having 1 to 3 carbon atoms

Specifically, as the primary amine having a high steric hindrance, for example, a compound selected from at least one of 2-amino-1-propanol (2A1P), 2-amino-1-butanol (2A1B), 2-amino-3-methyl-1-butanol (AMB), 1-amino-2-propanol (1A2P), 1-amino-2-butanol (1A2B), 2-amino-2-methyl-1-propanol (AMP), and the like can be exemplified, but the present invention is not limited thereto. Meanwhile, the above-described compounds may be combined together.

In addition, as the secondary linear monoamine, a compound represented by Chemical Formula (2) illustrated below with a title "Chem 2" is preferred.

[Chem 2]

$$R_4-\overset{\displaystyle H}{\overset{|}{N}}-R_5 \qquad (2)$$

$R_4$: Linear hydrocarbon group having 1 to 4 carbon atoms
$R_5$: Hydroxyalkyl group having 1 to 4 carbon atoms Specifically, as the secondary linear monoamine, for example, a compound selected from at least one of N-methylaminoethanol, N-ethylaminoethanol, N-propylaminoethanol, N-butylaminoethanol, and the like can be exemplified, but the present invention is not limited thereto. Meanwhile, the above-described compounds may be combined together.

In addition, as the tertiary linear monoamine, a compound represented by Chemical Formula (3) illustrated below with a title "Chem 3" is preferred.

[Chem 3]

$$R_6-\overset{\displaystyle R_7}{\overset{|}{N}}-R_8 \qquad (3)$$

$R_6$: Hydrocarbon group having 1 to 4 carbon atoms
$R_7$: Hydrocarbon group having 1 to 4 carbon atoms, hydroxyalkyl group
$R_8$: Hydrocarbon group having 1 to 4 carbon atoms, hydroxyalkyl group Specifically, as the tertiary linear monoamine, for example, a compound selected from at least one of N-methyldiethanolamine, N-ethyldiethanolamine, N-butyldiethanolamine, 4-dimethylamino-1-butanol, 2-dimethylaminoethanol, 2-diethylaminoethanol, 2-di-n-butylaminoethanol, N-ethyl-N-methylethanolamine, 3-dimethylamino-1-propanol, 2-dimethylamino-2-methyl-1-propanol, and the like can be exemplified, but the present invention is not limited thereto. Meanwhile, the above-described compounds may be combined together.

Here, as the above-described two-component-based blend of the linear monoamine, the following blend is preferred. A weight ratio of the primary linear monoamine having a high steric hindrance (a2 component)/the primary linear monoamine having a low steric hindrance (a1 component) is preferably set in a range ((a2)/(a1)) of 0.3 to 2.5. In addition, the weight ratio is more preferably set in a range of 0.3 to 1.2 and still more preferably set in a range of 0.3 to 0.7. This is because, at a ratio other than what has been described above, the absorption performance degrades more than an absorption performance obtained with a concentration of monoethanolamine (MEA) of 30% by weight, which has been generally used in the related art, as a reference.

In addition, a weight ratio of the tertiary linear monoamine (a4 component)/the secondary linear monoamine (a3 component) is preferably set in a range ((a4)/(a3)) of 0.3 to 2.5. In addition, the weight ratio is more preferably set in a range of 0.6 to 1.7 and still more preferably set in a range of 0.6 to 1.0. This is because, in a case in which the weight ratio is below the above-described range, the regeneration performance degrades, and, in a case in which the weight ratio is above the above-described range, the absorption performance deteriorates.

In addition, a weight ratio of the primary linear monoamine having a high steric hindrance (a2 component)/the secondary linear monoamine (a3 component) is preferably set in a range ((a2)/(a3)) of 0.3 to 2.5. In addition, the weight ratio is more preferably set in a range of 0.6 to 1.7 and still more preferably set in a range of 0.6 to 1.0. This is because, in a case in which the weight ratio is below the above-described range, the regeneration performance degrades, and, in a case in which the weight ratio is above the above-described range, the absorption performance deteriorates.

In addition, a weight ratio of the primary linear monoamine having a high steric hindrance (a2 component)/the tertiary linear monoamine (a4 component) is preferably set in a range ((a2)/(a4)) of 0.3 to 2.5. In addition, the weight ratio is more preferably set in a range of 0.6 to 1.7 and still more preferably set in a range of 0.6 to 1.0. This is because, in a case in which the weight ratio is below the above-described range, the absorption performance degrades, and, in a case in which the weight ratio is above the above-described range, the regeneration performance also deteriorates.

As the diamine (2) (b component), a diamine including at least one of a primary linear polyamine, a secondary linear polyamine, and a cyclic polyamine is preferred.

Here, as a primary or secondary linear polyamine group, for example, a compound selected from at least one of ethylenediamine (EDA), N,N'-dimethylethylenediamine (DMEDA), N,N'-diethylethylenediamine (DEEDA), propanediamine (PDA), N,N'-dimethylpropanediamine (DMPDA), and the like can be exemplified, but the present invention is not limited thereto. Meanwhile, the above-described compounds may be combined together.

In addition, as the cyclic polyamine, for example, a compound selected from at least one of piperazine (PZ), 1-methylpiperazine (1MPZ), 2-methylpiperazine (1MPZ), 2,5-dimethylpiperazine (DMPZ), 1-(2-aminoethyl)piperazine (AEPRZ), 1-(2-hydroxyethyl)piperazine (HEP), and the like can be exemplified, but the present invention is not limited thereto. Meanwhile, the above-described compounds may be combined together.

In addition, as the amide group-containing compound (3) (d component), a compound which has a boiling point at the atmospheric pressure of 130° C. or higher, has a dielectric constant at 25° C. of 20 or more, and contains an amide group is preferred.

Here, as the amide group-containing compound (3), for example, a compound selected from at least one of N-methylformamide, N-ethylformamide, N-methylacetamide, N-ethylacetamide, N,N-dimethylformamide, N,N-dimethylacetamide, N,N-diethylformamide, N,N-diethylacetamide, N-methylpyrrolidone, and the like can be exemplified, but the present invention is not limited thereto. Meanwhile, the above-described compounds may be combined together.

Figure 2:
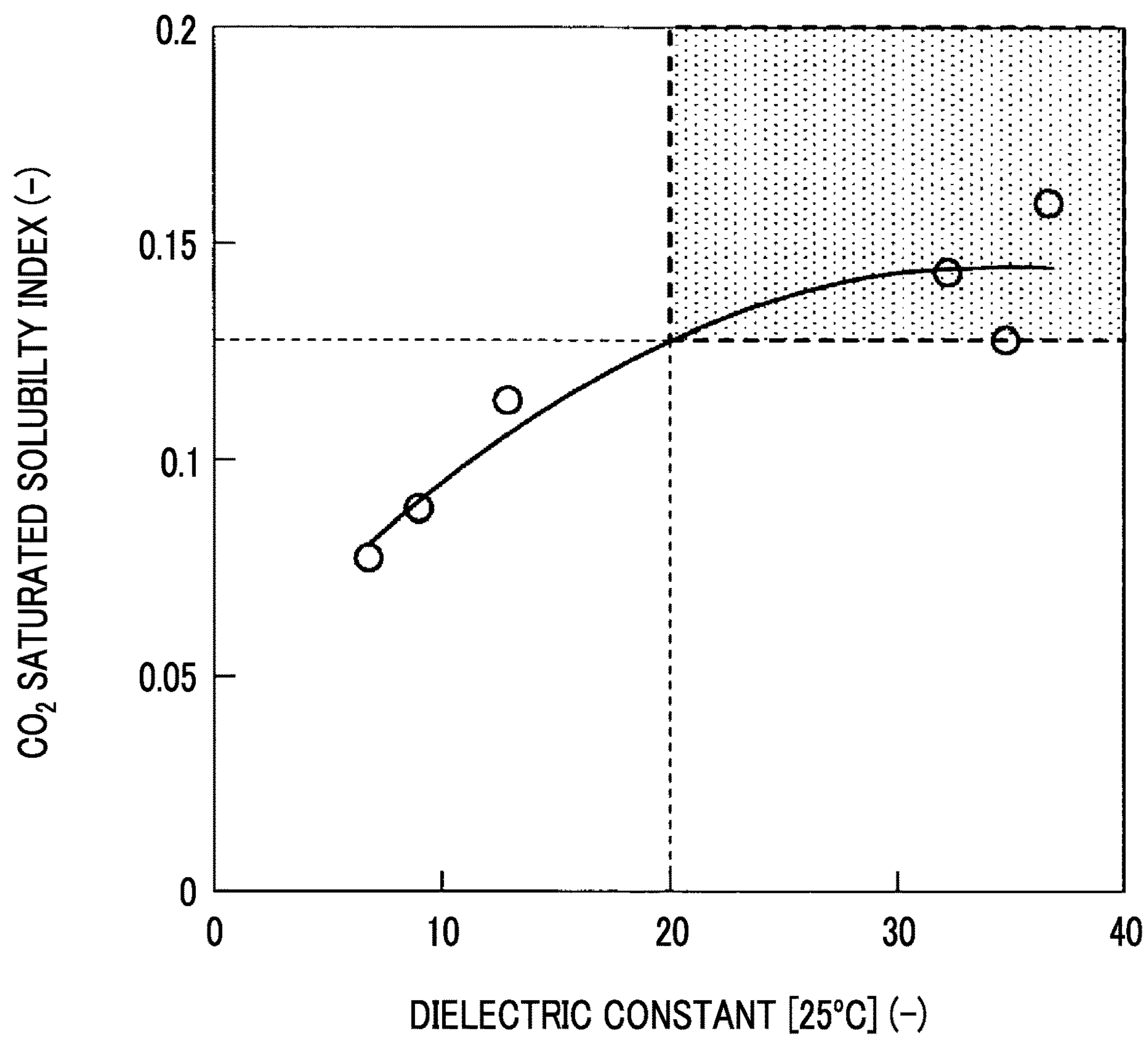
FIG. 2 is a graph illustrating a relationship between a dielectric constant and a $CO_2$ saturated solubility index.

FIG. 2 is a graph illustrating the relationship between the dielectric constant and the CO2 saturated solubility index. The horizontal axis of FIG. 2 indicates the dielectric constant (25° C.), and the vertical axis indicates the $CO_2$ saturated solubility index at that time.

The dielectric constant along the horizontal axis is a value of a static dielectric constant under a low frequency condition (100 MHz or lower).

As illustrated in FIG. 2, under a condition of the values of the dielectric constant along the horizontal axis of 20 or more, the increase tendency of the $CO_2$ saturated solubility index along the vertical axis blunts, and a region in which the $CO_2$ saturated solubility index is an approximately constant high value is formed. The dielectric constant is an index of the polarity of a compound, and, in a region of a low dielectric constant, an increase in the polarity significantly contributes to the $CO_2$ saturated dissolution capability; however, in a region of a sufficiently high polarity, the contribution of a factor other than $CO_2$ dissolution, for example, the interaction between solvents, increases, and thus the realization of a $CO_2$ saturated solubility increase effect by an increase in the dielectric constant becomes difficult, which is considered as one cause of the blunting of the increase tendency.

Therefore, regarding a reboiler duty as well, similarly, a reboiler duty reduction effect by an increase in the dielectric constant is assumed to blunt in a region of a sufficiently high dielectric constant (for example, or more). Here, regarding the measurement of the dielectric constant, the dielectric constant was measured at 25° C.

The total concentration of the linear monoamine (1) (a component) and the diamine (2) (b component) is preferably 40% to 60% by weight of the entire absorbing solution and more preferably set to 47% to 55% by weight of the entire absorbing solution.

This is because, when the total concentration is outside the above-described range, the composite amine absorbing solution does not favorably function as an absorbing solution.

In addition, the blending ratio of the diamine (2) (b component) and the amide group-containing compound (3) (d component) with respect to the linear monoamine (1) (a component) is preferably a blend of (b+d)/a=0.16 to 2.1.

This is because, under a low-concentration blend condition of this blend, the reboiler duty reduction effect becomes limited, and, on the other hand, under a high-concentration blend condition, the blend is not efficient in terms of a practical aspect such as an increase in the liquid viscosity.

The blending ratio between the diamine (2) (b component) and the amide group-containing compound (3) (d component) is preferably set to b:d=1:0.4 to 1:54.

Under a low-ratio condition of this blending ratio, the reboiler duty reduction effect becomes limited, and, on the other hand, under a high-ratio condition, the ratio is not efficient in terms of a practical aspect such as an increase in the liquid viscosity.

In the present invention, the absorbing temperature in an absorption tower during the contact with an exhaust gas containing $CO_2$ or the like is, generally, preferably set in a range of 30° C. to 80° C. In addition, to the absorbing solution that is used in the present invention, a corrosion inhibitor, a deterioration inhibitor, or the like are added as necessary.

In the present invention, the regeneration temperature in a regeneration tower that desorbs $CO_2$ or the like from the absorbing solution that has absorbed $CO_2$ or the like is preferably is 110° C. or higher in a case in which the regeneration tower inner pressure is 130 to 200 kPa (absolute pressure). This is because, during regeneration at lower than 110° C., an increase in the circulation amount of the absorbing solution in a system becomes necessary, which is not preferable from the viewpoint of the regenerating efficiency. More preferably, regeneration at 115° C. or higher is preferred.

As a gas that is treated using the present invention, for example, a coal gasified gas, a synthetic gas, a coke-oven gas, a petroleum gas, a natural gas, and the like can be exemplified, but the gas is not limited thereto, and any gas can be treated using the present invention as long as the gas includes an acidic gas such as $CO_2$ or $H_2S$.

A process that can be employed in the method for removing $CO_2$ or $H_2S$ or both in a gas of the present invention is not particularly limited, and an example of a removal device that removes $CO_2$ will be described with reference to FIG. 1.

FIG. 1 is a schematic diagram illustrating the constitution of a $CO_2$ recovery device according to Example 1. As illustrated in FIG. 1, the $CO_2$ recovery device according to Example 1 has an exhaust gas cooling device 16 that cools an exhaust gas containing $CO_2$ and $O_2$ exhausted from an industrial combustion facility 13 such as a boiler or a gas turbine using a cooling water 15, a $CO_2$ absorption tower 18 having a $CO_2$ recovery section 18A that removes $CO_2$ from the exhaust gas 14 by bringing the exhaust gas 14 containing the cooled $CO_2$ and a $CO_2$ absorbing solution that absorbs $CO_2$ (hereinafter, also referred to as the "absorbing solution") 17 into contact with each other, and an absorbing solution regeneration tower 20 that regenerates the $CO_2$ absorbing solution by desorbing $CO_2$ from a $CO_2$ absorbing solution that has absorbed $CO_2$ (hereinafter, also referred to as the "rich solution") 19. In addition, in this $CO_2$ recovery device 12, the regenerated $CO_2$ absorbing solution 17 from which $CO_2$ has been removed in the absorbing solution regeneration tower 20 (hereinafter, also referred to as the "lean solution") is reused as a $CO_2$ absorbing solution in the $CO_2$ absorption tower 18.

Meanwhile, in FIG. 1, reference sign **13*a* represents a smoke path, reference sign 13*b* represents a chimney, and reference sign 34 represents steam-condensed water. The $CO_2$ recovery device 12 is provided in the back in order to recover $CO_2$ from an existing exhaust gas source in some cases or is provided together with a newly-provided exhaust gas source in some cases. Meanwhile, an openable and closable damper is installed in a line for the exhaust gas 14, and the damper is opened during the operation of the $CO_2$ recovery device 12. In addition, the damper is set to be closed when the exhaust gas source is in operation, but the operation of the CO2 recovery device 12** is stopped.

In a method for recovering CO2 using this CO2 recovery device 12, first, the exhaust gas 14 from the industrial combustion facility 13 such as a boiler or a gas turbine including $CO_2$ is pressurized using an exhaust gas blower 22, then, sent to the exhaust gas cooling device 16, cooled using the cooling water 15 in the exhaust gas cooling device, and sent to the $CO_2$ absorption tower 18.

In the $CO_2$ absorption tower 18, the exhaust gas 14 comes into countercurrent contact with the $CO_2$ absorbing solution 17 which is the amine absorbing solution according to the present example, and $CO_2$ in the exhaust gas 14 is absorbed into the $CO_2$ absorbing solution 17 by a chemical reaction.

A $CO_2$-removed exhaust gas from which $CO_2$ has been removed in the CO2 recovery section 18A come into gas-liquid contact with a circulating rinse water 21 including a $CO_2$ absorbing solution that is supplied from a liquid distributor in a water washing section 18B in the $CO_2$ absorption tower 18, the $CO_2$ absorbing solution 17 accompanied by the $CO_2$-removed exhaust gas is recovered, and then an exhaust gas 23 from which $CO_2$ has been removed is desorbed to the outside of the system.

In addition, the rich solution which is the $CO_2$ absorbing solution 19 which has absorbed $CO_2$ is pressurized using a rich solution pump 24, heated by the lean solution which is the $CO_2$ absorbing solution 17 regenerated in the absorbing solution regeneration tower 20 in a rich•lean solution heat exchanger 25, and supplied to the absorbing solution regeneration tower 20.

The rich solution 19 desorbed from the upper section to the inside of the absorbing solution regeneration tower causes an endothermic reaction using steam that is supplied from the bottom section, and a majority of $CO_2$ is desorbed. The $CO_2$ absorbing solution from which some or a majority of $CO_2$ has been desorbed in the absorbing solution regeneration tower 20 is referred to as the semi-lean solution. This semi-lean solution turns into the $CO_2$ absorbing solution (lean solution) 17 from which almost all of $CO_2$ has been removed when reaching the bottom section of the absorbing solution regeneration tower 20. Some of this lean solution 17 is overheated by steam 27 in a reboiler 26, and steam for $CO_2$ desorption is supplied to the inside of the absorbing solution regeneration tower 20. Meanwhile, in FIG. 1, reference sign 27 represents a steam introduction pipe that introduces steam to the reboiler 26, reference sign 30 represents a gas-liquid separator, and reference sign 34 represents a condensed water desorbing pipe that desorbs condensed water separated using the gas-liquid separator 30 respectively.

Meanwhile, from the tower top section of the absorbing solution regeneration tower 20, a $CO_2$ accompanying gas 28 carrying steam desorbed from the rich solution 19 and the semi-lean solution in the tower is derived, the steam is condensed using a condenser 29, water is separated in a separation drum 30, and a $CO_2$ gas is desorbed to the outside of the system, compressed using a separate compressor 41, and recovered. This compressed and recovered $CO_2$ gas 42 passes through a separation drum 43 and is then injected into an oilfield using enhanced oil recovery (EOR) or retained in an aquifer to build a global warming countermeasure.

Reflux water 31 separated and refluxed from the $CO_2$ accompanying gas 28 carrying steam in the separation drum 30 is supplied to the upper section and the rinse water 21 side of the absorbing solution regeneration tower 20 using a reflux water circulation pump 35 respectively.

The regenerated $CO_2$ absorbing solution (lean solution) is cooled using the rich solution 19 in a rich•lean solution heat exchanger 25, subsequently, pressurized using a lean solution pump 32, furthermore, cooled using a lean solution cooler 33, and then supplied to the inside of the $CO_2$ absorption tower 18. Meanwhile, this embodiment merely describes the outline, and some of accompanying devices are not described.

Hereinafter, preferred test examples exhibiting the effect of the present invention will be described, but the present invention is not limited thereto.

Test Examples $CO_2$ was absorbed using an absorption testing device not illustrated. FIGS. 3 to 7 are graphs illustrating the reboiler duty reduction percentages of three-component-based composite amine absorbing solutions (solutions obtained by dissolving in water (c component) (1) a linear monoamine (a component), (2) a diamine (b component), and (3) an amide group-containing compound (d component)) in Test Examples 1 to 16. Here, the total of the linear monoamine (a component) and the diamine (b component) was set in a range of 47% by weight to 55% by weight in the test examples. Here, for comparative examples, the reboiler duties were obtained under the same conditions as for the test examples except for the fact that the amide group-containing compound (d component) was not included in the respective blends, and the respective reboiler duty reduction percentages (%) were obtained using the reboiler duties of these comparative examples as references. Meanwhile, the list of the components of the test examples is shown in "Table 1" below.

TABLE 1

| | | | | | (d) Amide group-containing compound | | |
|---|---|---|---|---|---|---|---|
| Test Example | (a) Linear monoamine | | (b) Diamine | (c) Water | Component | Added weight ratio | Total concentration of a + b |
| 1 | N-ethylaminoethanol | — | 2-Methylpiperazine | Water | N,N-dimethylacetamide | 0.5 | A range from 47% by weight to 55% by weight |
| 2 | N-ethylaminoethanol | — | Piperazine | Water | N,N-dimethylacetamide | 0.5 | |
| 3 | N-butylaminoethanol | — | 2-Methylpiperazine | Water | N,N-dimethylacetamide | 0.5 | |
| 4 | N-butylaminoethanol | — | Piperazine | Water | N,N-dimethylacetamide | 0.5 | |
| 5 | Monoethanolamine | 2-Amino-2-methyl-1-propanol | Propanediamine | Water | N,N-dimethylacetamide | 0.25 | |
| 6 | Monoethanolamine | 2-Amino-2-methyl-1-propanol | Propanediamine | Water | N,N-dimethylacetamide | 0.25 | |
| 7 | Monoethanolamine | 2-Amino-2-methyl-1-propanol | Piperazine | Water | N,N-dimethylacetamide | 0.25 | |
| 8 | Monoethanolamine | 2-Amino-2-methyl-1-propanol | Propanediamine | Water | N,N-dimethylacetamide | 0.5 | |
| 9 | Monoethanolamine | 2-Amino-2-methyl-1-propanol | Propanediamine | Water | N,N-dimethylacetamide | 0.5 | |
| 10 | Monoethanolamine | 2-Amino-2-methyl-1-propanol | Piperazine | Water | N,N-dimethylacetamide | 0.5 | |
| 11 | N-ethylaminoethanol | N-methyldiethanolamine | Piperazine | Water | N,N-dimethylacetamide | 0.5 | |

TABLE 1-continued

| Test Example | (a) Linear monoamine | | (b) Diamine | (c) Water | (d) Amide group-containing compound | | Total concentration of a + b |
|---|---|---|---|---|---|---|---|
| | | | | | Component | Added weight ratio | |
| 12 | N-butylaminoethanol | N-methyldiethanolamine | Piperazine | Water | N,N-dimethylacetamide | 0.5 | |
| 13 | N-ethylaminoethanol | 2-Amino-2-methyl-1-propanol | Piperazine | Water | N,N-dimethylacetamide | 0.5 | |
| 14 | N-butylaminoethanol | 2-Amino-2-methyl-1-propanol | Piperazine | Water | N,N-dimethylacetamide | 0.5 | |
| 15 | N-methyldiethanolamine | 2-Amino-2-methyl-1-propanol | Piperazine | Water | N,N-dimethylacetamide | 0.5 | |
| 16 | 4-Dimethylamino-1-butanol | 2-Amino-2-methyl-1-propanol | Piperazine | Water | N,N-dimethylacetamide | 0.5 | |

Test Examples 1 to 4

In Test Example 1, as the linear monoamine (a component), N-ethylaminoethanol was used, as the diamine (b component), 2-methylpiperazine was used, as the amide group-containing compound (d component), N,N-dimethylacetamide was used, and the components were dissolved and mixed together in water, thereby producing individual absorbing solutions.

The value of the dielectric constant (25° C.) of N,N-dimethylacetamide (d component) was 38 (which shall apply below).

In Test Example 2, as the linear monoamine (a component), N-ethylaminoethanol was used, as the diamine (b component), piperazine was used, as the amide group-containing compound (d component), N,N-dimethylacetamide was used, and the components were dissolved and mixed together in water, thereby producing individual absorbing solutions.

In Test Example 3, as the linear monoamine (a component), N-butylaminoethanol was used, as the diamine (b component), 2-methylpiperazine was used, as the amide group-containing compound (d component), N,N-dimethylacetamide was used, and the components were dissolved and mixed together in water, thereby producing individual absorbing solutions.

In Test Example 4, as the linear monoamine (a component), N-butylaminoethanol was used, as the diamine (b component), piperazine was used, as the amide group-containing compound (d component), N,N-dimethylacetamide was used, and the components were dissolved and mixed together in water, thereby producing individual absorbing solutions.

Meanwhile, in Test Examples 1 to 4, the weight ratios of the amide group-containing compound (d component) to water (c component) added ((d)/(c+d)) were set to 0.5.

Absorption conditions in these tests were set to 40° C. and 10 $kPaCO_2$, additionally, a regeneration condition was set to 120° C., and the reboiler duty reduction percentages (%) were obtained.

Figure 3:
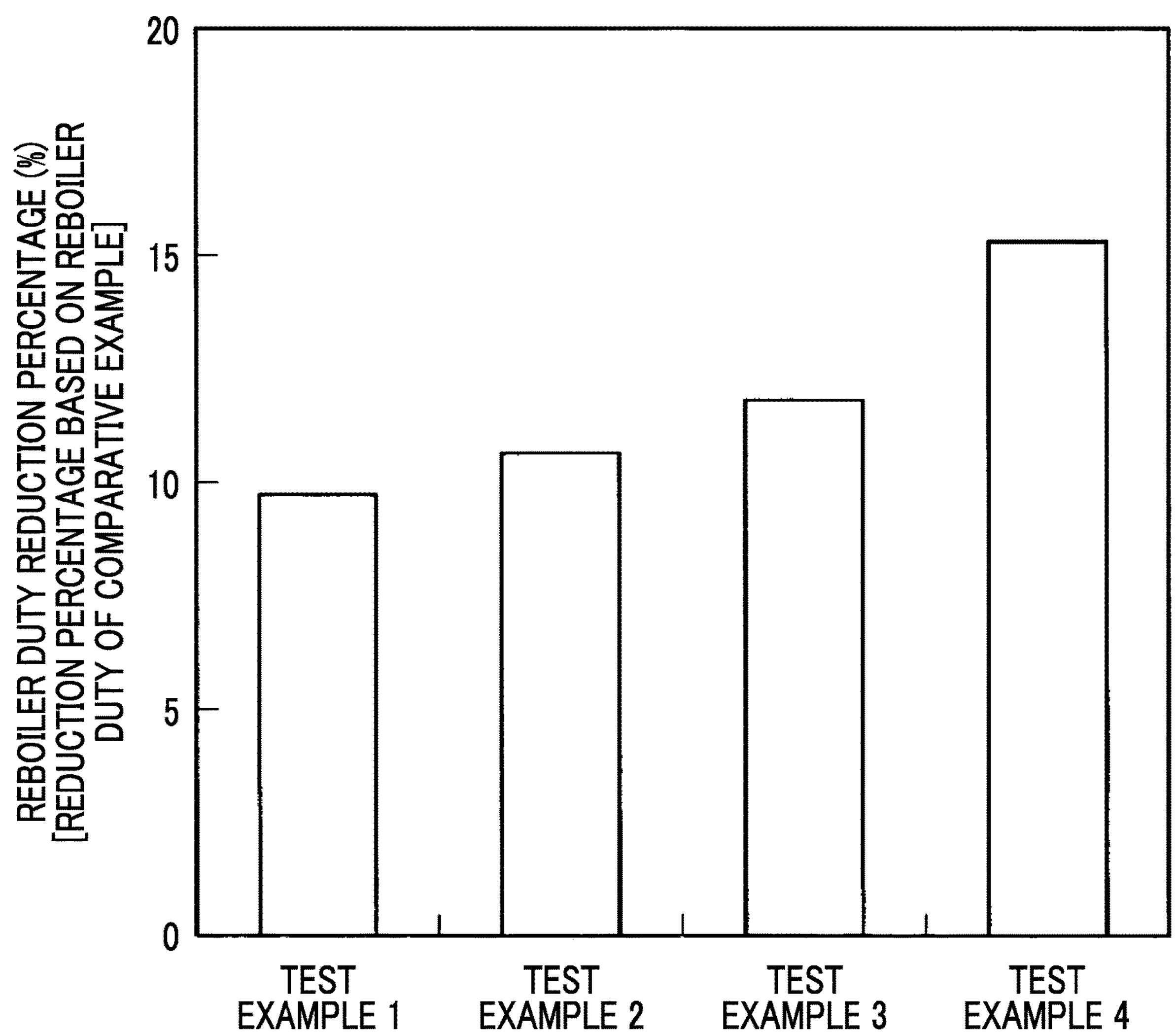
FIG. 3 is a graph illustrating reboiler duty reduction percentages according to Test Examples 1 to 4.

The results of these Test Examples 1 to 4 are illustrated in FIG. 3.

As illustrated in FIG. 3, the reboiler duty reduction percentage was approximately 10% in Test Example 1, the reboiler duty reduction percentages exceeded 10% in Test Examples 2, 3, and 4, and the reboiler duty reduction percentage exceeded 15% in Test Example 4.

Test Examples 5 to 10

In Test Example 5, two kinds of the linear monoamine (1) (a component) were used, monoethanolamine was used as the first linear monoamine, and 2-amino-2-methyl-1-propanol was used as the second linear monoamine.

In addition, as the diamine (2) (b component), propanediamine was used, as the amide group-containing compound (3) (d component), N,N-dimethylacetamide was used, and the components were dissolved and mixed together in water, thereby producing individual absorbing solutions.

In Test Example 6, two kinds of the linear monoamine (a component) were used, monoethanolamine was used as the first linear monoamine, and 2-amino-2-methyl-1-propanol was used as the second linear monoamine.

In addition, as the diamine (b component), propanediamine was used, as the amide group-containing compound (d component), N,N-diethylacetamide was used, and the components were dissolved and mixed together in water, thereby producing individual absorbing solutions.

The value of the dielectric constant (25° C.) of N,N-diethylacetamide (d component) was 31 (which shall apply below).

In Test Example 7, two kinds of the linear monoamine (a component) were used, monoethanolamine was used as the first linear monoamine, and 2-amino-2-methyl-1-propanol was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

Meanwhile, in Test Examples 5 to 7, the weight ratios of the amide group-containing compound (d component) to water (c component) added ((d)/(c+d)) were set to 0.25.

In addition, in Test Examples 8 to 10, the components were blended in the same manner as in Test Examples 5 to 7 except for the fact that the weight ratios of the amide group-containing compound (d component) to water (c component) added ((d)/(c+d)) were set to 0.5.

Absorption conditions in these tests were set to 40° C. and 10 $kPaCO_2$, additionally, a regeneration condition was set to 120° C., and the reboiler duty reduction percentages (%) were obtained.

Figure 4:
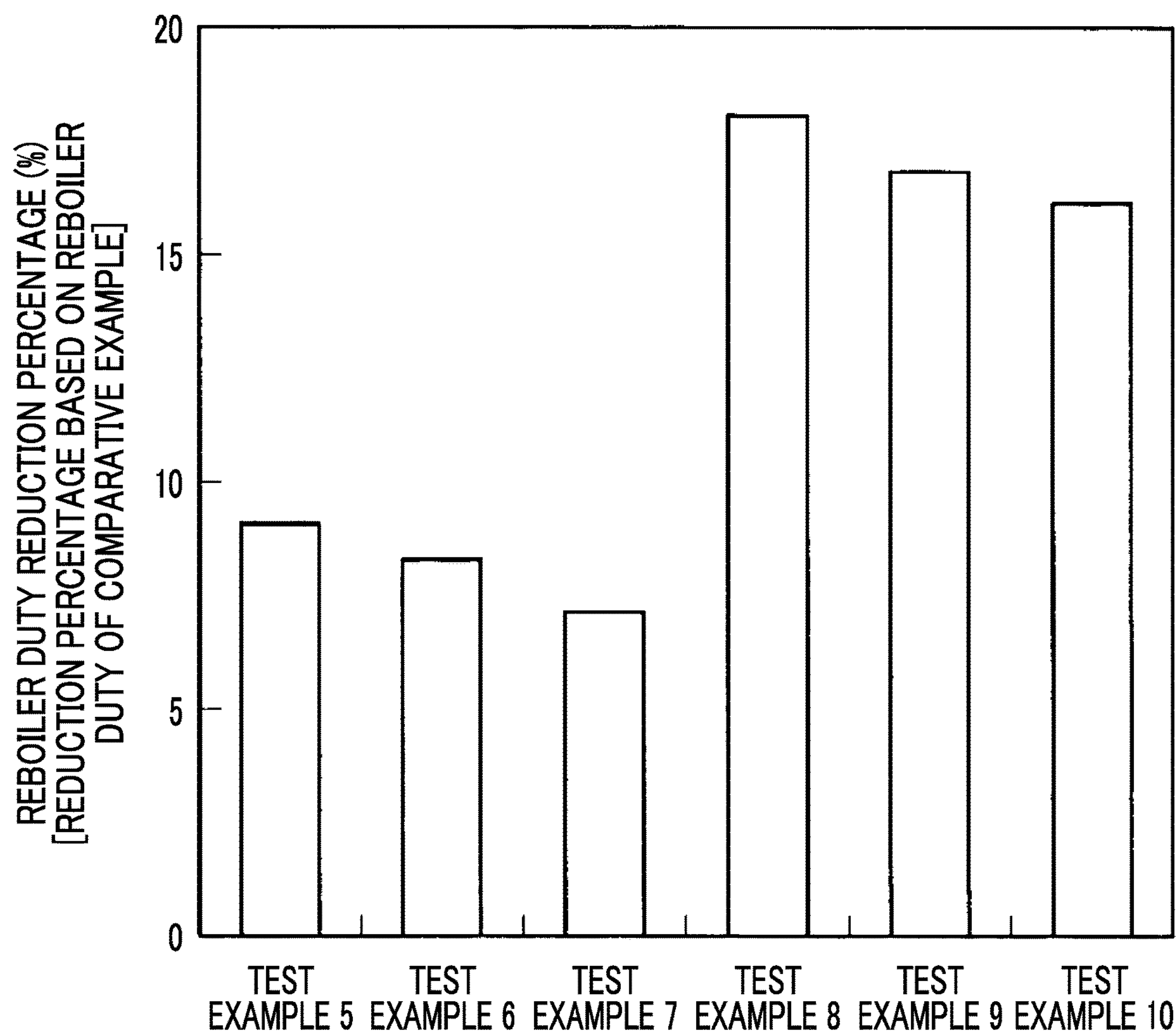
FIG. 4 is a graph illustrating reboiler duty reduction percentages according to Test Examples 5 to 10.

The results of these Test Examples 5 to 10 are illustrated in FIG. 4.

As illustrated in FIG. 4, the reboiler duty reduction percentages were approximately 7 to 9% in Test Examples 5 to 7, and the reboiler duty reduction percentages exceeded 16% in Test Examples 8, 9, and 10.

Test Examples 11 to 16

In Test Example 11, two kinds of the linear monoamine (1) (a component) were used, N-ethylaminoethanol was used as the first linear monoamine, and N-methyldiethanolamine was used as the second linear monoamine.

In addition, as the diamine (2) (b component), piperazine was used, as the amide group-containing compound (3) (d component), N,N-dimethylacetamide was used, and the components were dissolved and mixed together in water, thereby producing individual absorbing solutions.

In Test Example 12, two kinds of the linear monoamine (a component) were used, N-butylaminoethanol was used as the first linear monoamine, and N-methyldiethanolamine was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

In Test Example 13, two kinds of the linear monoamine (a component) were used, N-ethylaminoethanol was used as the first linear monoamine, and 2-amino-2-methyl-1-propanol was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

In Test Example 14, two kinds of the linear monoamine (a component) were used, N-butylaminoethanol was used as the first linear monoamine, and 2-amino-2-methyl-1-propanol was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

In Test Example 15, two kinds of the linear monoamine (a component) were used, N-methyldiethanolamine was used as the first linear monoamine, and 2-amino-2-methyl-1-propanol was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

In Test Example 16, two kinds of the linear monoamine (a component) were used, 4-dimethylamino-1-butanol was used as the first linear monoamine, and 2-amino-2-methyl-1-propanol was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

Meanwhile, in Test Examples 11 to 16, the weight ratios of the amide group-containing compound (d component) to water (c component) added ((d)/(c+d)) were set to 0.5.

Absorption conditions in these tests were set to 40° C. and 10 kPa$CO_2$, additionally, a regeneration condition was set to 120° C., and the reboiler duty reduction percentages (%) were obtained.

Figure 5:
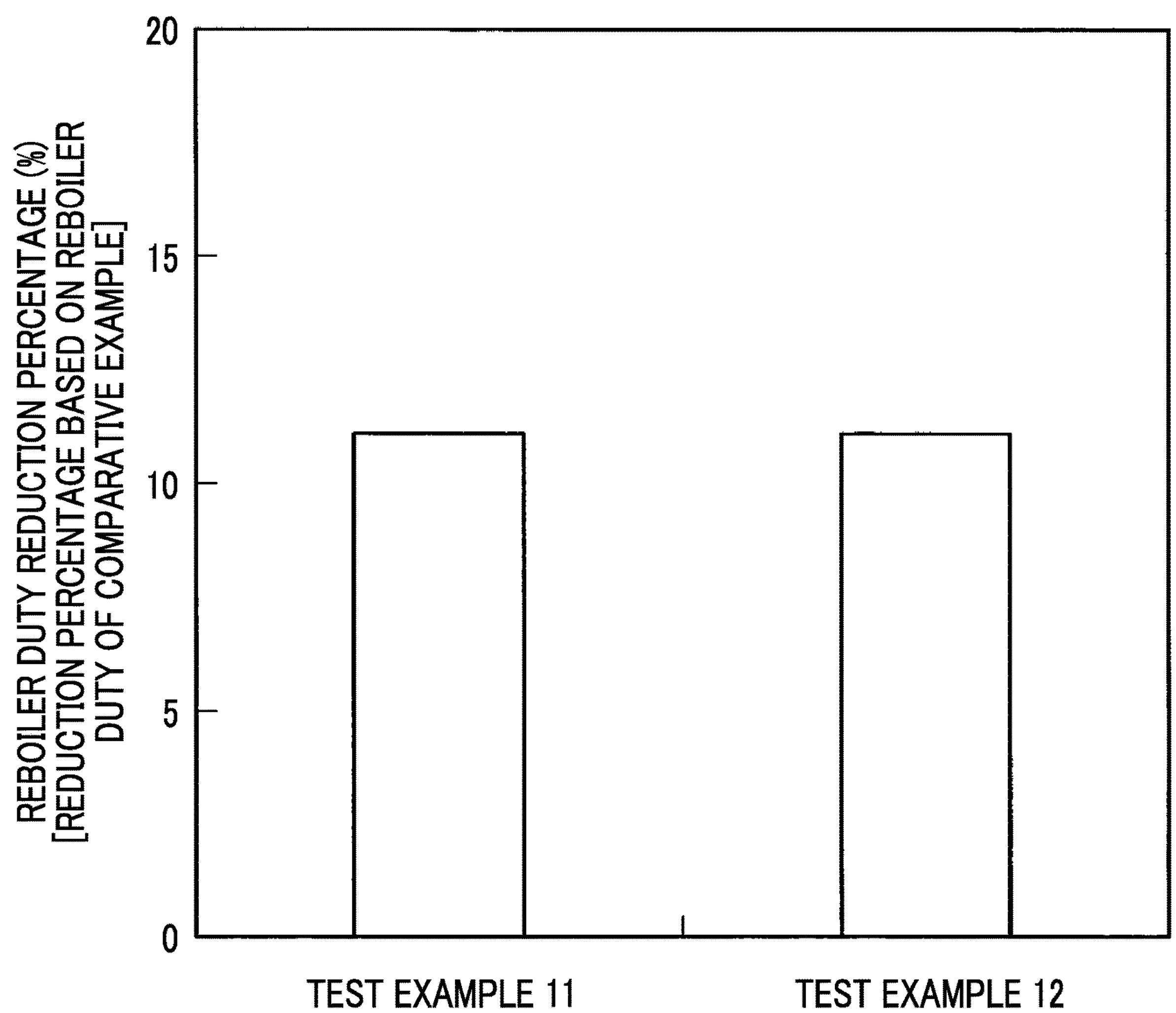
FIG. 5 is a graph illustrating reboiler duty reduction percentages according to Test Examples 11 and 12.
Figure 6:
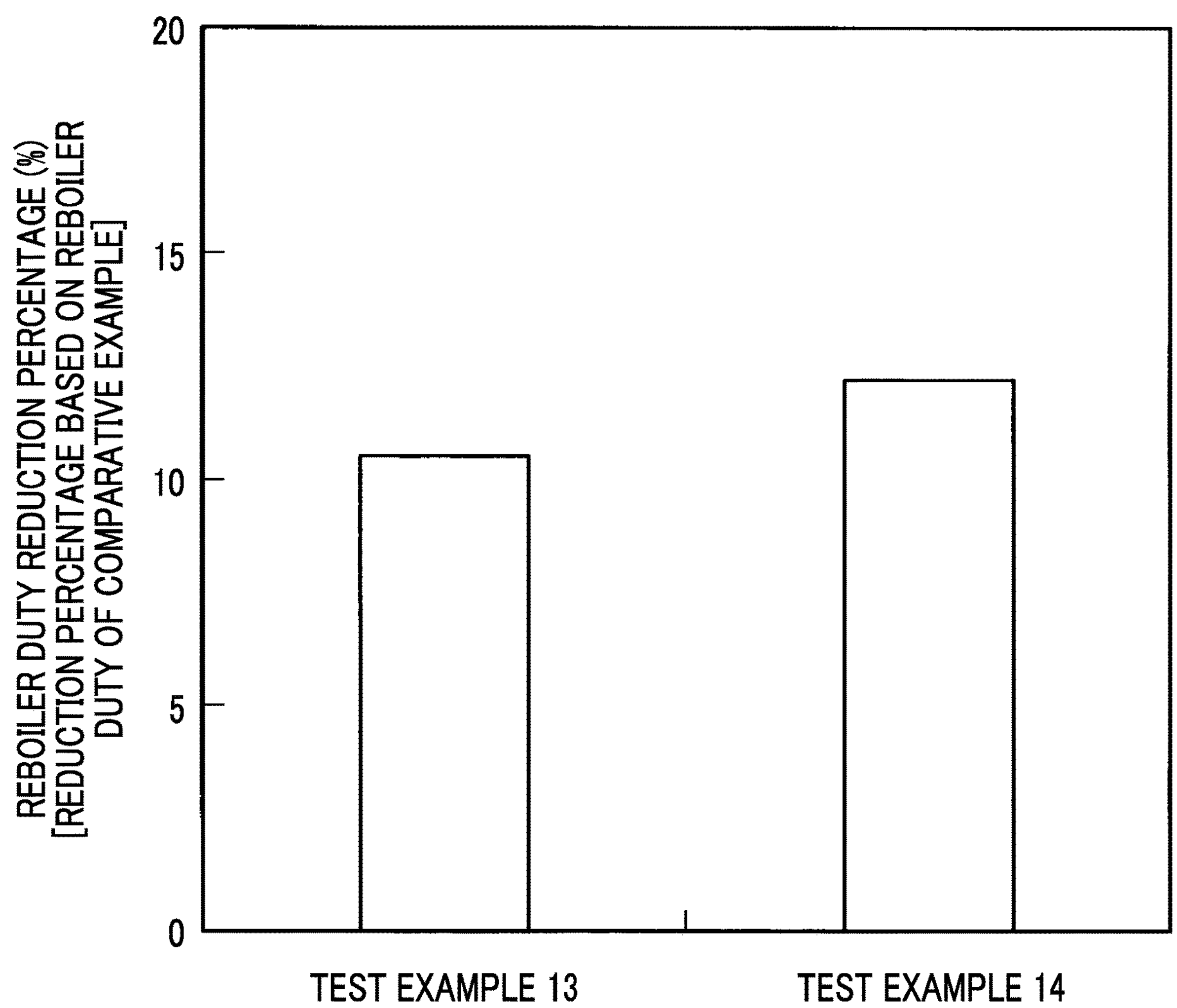
FIG. 6 is a graph illustrating reboiler duty reduction percentages according to Test Examples 13 and 14.
Figure 7:
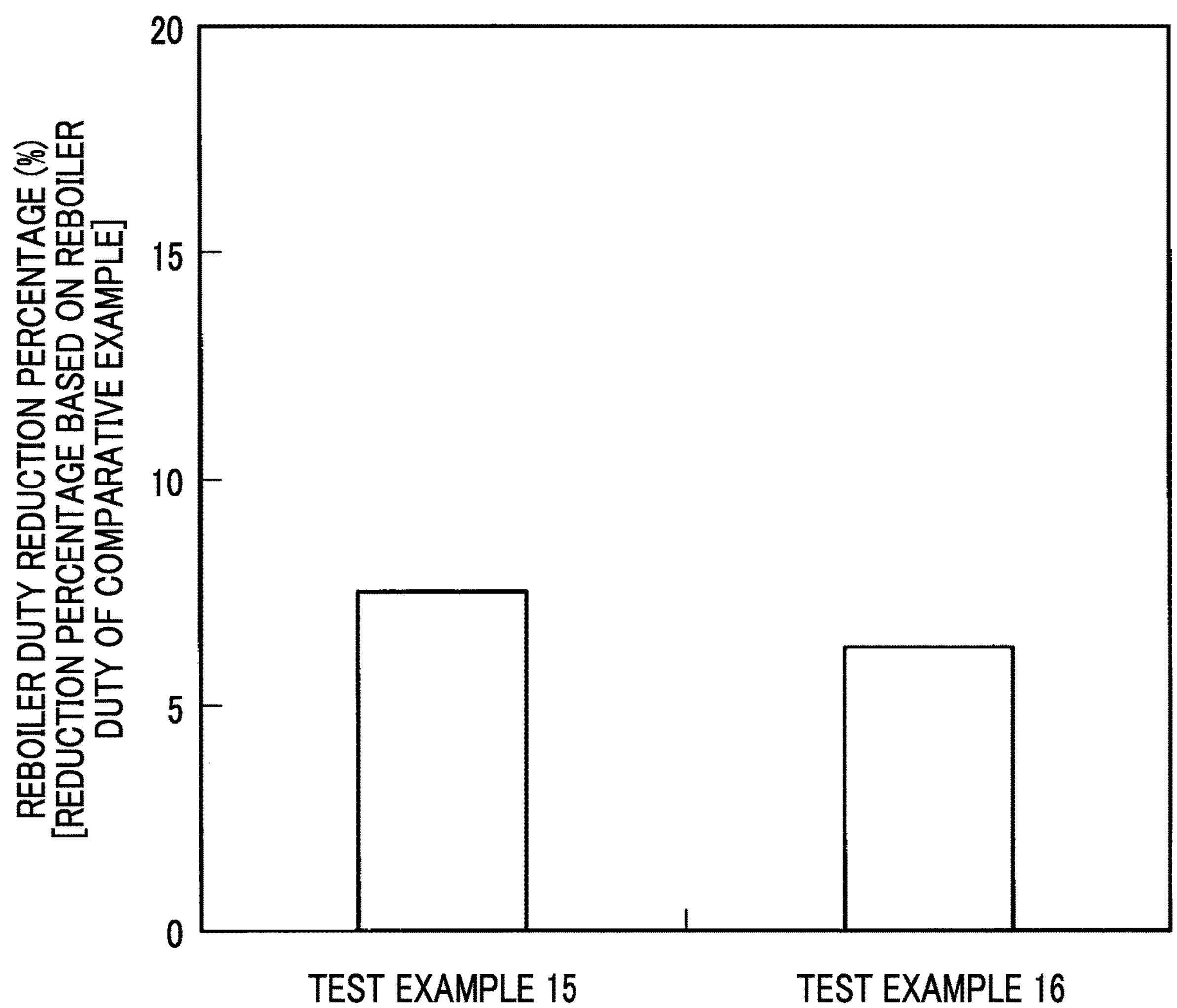
FIG. 7 is a graph illustrating reboiler duty reduction percentages according to Test Examples 15 and 16.

The results of these Test Examples 11 and 12 are illustrated in FIG. 5, the results of these Test Examples 13 and 14 are illustrated in FIG. 6, and the results of these Test Examples 15 and 16 are illustrated in FIG. 7, respectively.

As illustrated in FIG. 5, the reboiler duty reduction percentages exceeded 10% in Test Examples 11 and 12, and, as illustrated in FIG. 6, the reboiler duty reduction percentages exceeded 10% in Test Examples 13 and 14.

As illustrated in FIG. 7, the reboiler duty reduction percentages exceeded 7% in Test Examples 15 and 16.

What has been described above shows that, according to the present invention, the absorbing solution is obtained by dissolving in water (c component) the linear monoamine (1) (a component), the diamine (2) (b component), and the amide group-containing compound (3) (d component), and thus it is possible to provide a composite amine absorbing solution having a superior energy-saving performance to a composite amine absorbing solution of the related art, and it is possible to reduce the reboiler duty when regenerating an absorbing solution that has absorbed $CO_2$ or $H_2S$ or both in a gas.

Test Example 17

In Test Example 17, the components were blended in the same manner as in Test Example 16, two kinds of the linear monoamine (1) (a component) were used, 4-dimethylamino-1-butanol was used as the first linear monoamine, and 2-amino-2-methyl-1-propanol was used as the second linear monoamine.

In addition, as the diamine (b component), piperazine was used, as the amide group-containing compound (d component), N,N-dimethylacetamide was used, and the components were dissolved and mixed together in water, thereby producing individual absorbing solutions.

Comparative Example 17-1 of Test Example 17 was a composite amine absorbing solution obtained by excluding N,N-dimethylacetamide as the amide group-containing compound (d component) from the blend of Test Example 17.

Comparative Example 17-2 of Test Example 17 was a composite amine absorbing solution obtained by excluding piperazine as the diamine (b component) from the blend of Test Example 17. Meanwhile, the concentration was set to be identical to the total concentration in Test Example 17 by increasing the concentration of 4-dimethylamino-1-butanol as much as a decrease in the amount of the diamine (b component).

Comparative Example 17-3 of Test Example 17 was a composite amine absorbing solution obtained by excluding piperazine as the diamine (b component) and N,N-dimethylacetamide as the amide group-containing compound (d component) from the blend of Test Example 17.

Absorption conditions in this test were set to 40° C. and 10 kPa$CO_2$, additionally, a regeneration condition was set to 120° C., and the reboiler duty reduction percentage (%) was obtained.

The reduction percentage of the reboiler duty was defined as described in the following expression.

Reboiler duty reduction percentage ratio=(reboiler duty reduction percentage (%) of Test Example 17 relative to Comparative Example 17-1 not including amide group-containing compound)/(reboiler duty reduction percentage (%) of Comparative Example 17-2 not including diamine relative to Comparative Example 17-3 not including diamine and amide group-containing compound)

Figure 8:
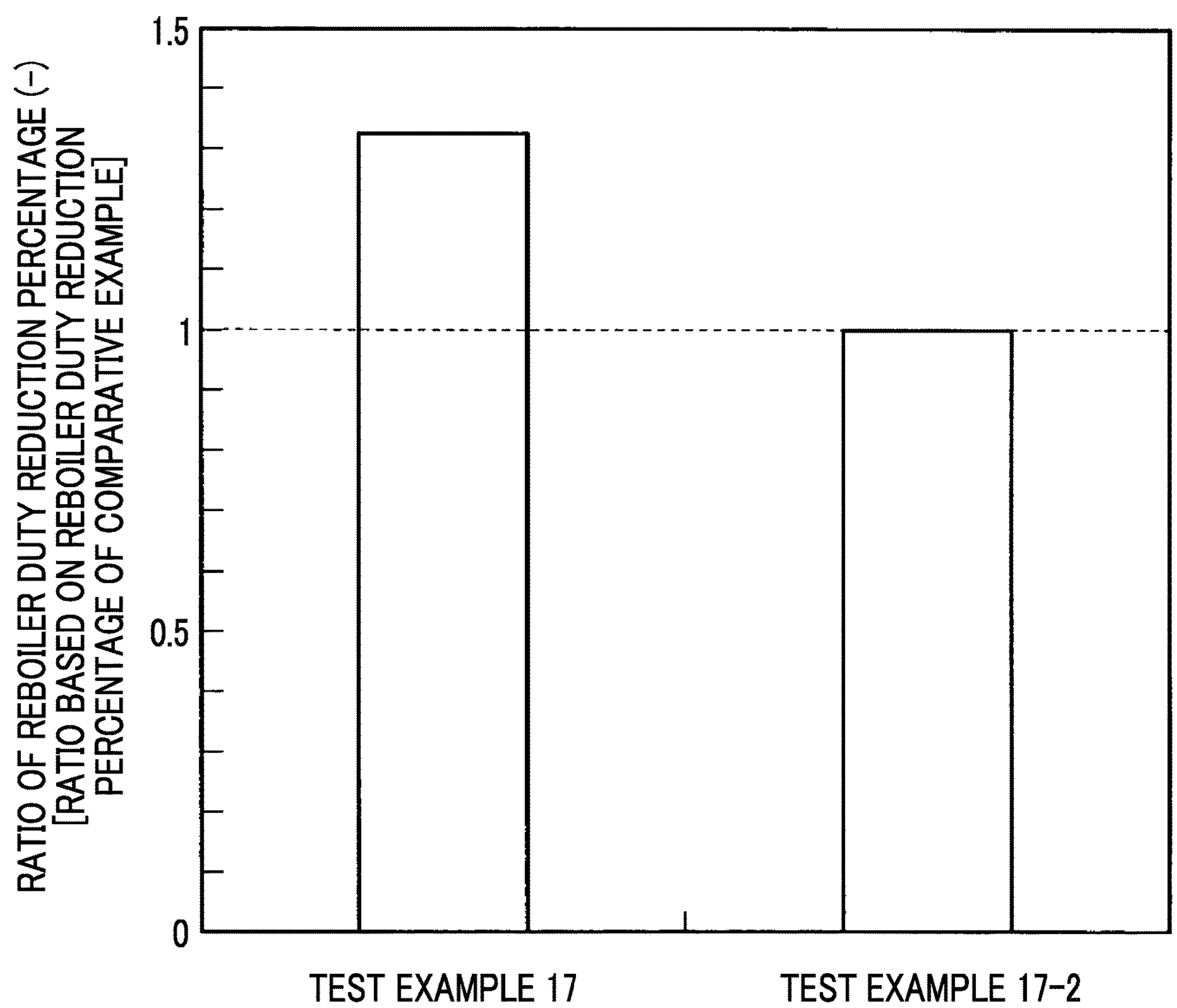
FIG. 8 is a graph illustrating a ratio between reboiler duty reduction percentages according to Test Example 17.

This result is illustrated in FIG. 8. FIG. 8 is a graph illustrating the ratio between the reboiler duty reduction percentages in Test Example 17 and the comparative example.

As illustrated in FIG. 8, Test Example 17 including the diamine has an effect of the reboiler duty reduction percentage being 1.3 times or more the reboiler duty reduction percentage in Comparative Example 17-2 not including the diamine. This effect is attributed not only to the excellent absorption performance of the diamine (b component) but also to a regeneration performance improvement effect including the reduction of the steam latent heat amount of an outlet gas from the absorbing solution regeneration tower 20 by the interaction with the amide group-containing compound (d component).

As described above, the effect of the addition of the amide group-containing compound (d component) when containing the diamine (b component) is not an effect that can be easily obtained from the gas-liquid equilibrium alone, but an effect that has been first obtained as a result of intensive studies of the reboiler duty.

REFERENCE SIGNS LIST $CO_2$ RECOVERY DEVICE
13 INDUSTRIAL COMBUSTION FACILITY
14 EXHAUST GAS
16 EXHAUST GAS COOLING DEVICE
17 $CO_2$ ABSORBING SOLUTION (LEAN SOLUTION)
$CO_2$ ABSORPTION TOWER
$CO_2$ ABSORBING SOLUTION THAT HAS ABSORBED $CO_2$ (RICH SOLUTION)
20 ABSORBING SOLUTION REGENERATION TOWER
21 RINSE WATER

The invention claimed is:

1. A composite amine absorbing solution that absorbs $CO_2$ or $H_2S$ or both in a gas, the composite amine absorbing solution comprising:

two kinds of linear monoamine selected from a combination of a primary linear monoamine having a low steric hindrance and a primary linear monoamine having a high steric hindrance, a combination of a secondary linear monoamine and a tertiary linear monoamine, a combination of the primary linear monoamine having a high steric hindrance and the secondary linear monoamine, and a combination of the primary linear monoamine having a high steric hindrance and the tertiary linear monoamine, a diamine; and an amide group-containing compound having a boiling point of 130° C. or higher at an atmospheric pressure and having a dielectric constant of 20 or more at 25° C., wherein the primary linear monoamine having the low steric hindrance is a compound selected from monoethanolamine (MEA), 3-amino-1-propanol, 4-amino-1-butanol, and diglycolamine, the primary linear monoamine having the high steric hindrance is a compound selected from 2-amino-1-propanol (2A1P), 2-amino-1-butanol (2A1B), 2-amino-3-methyl-1-butanol (AMB), 1-amino-2-propanol (1A2P), 1-amino-2-butanol (1A2B), and 2-amino-2-methyl-1-propanol (AMP), a blending ratio of the diamine and the amide group-containing compound with respect to the two kinds of linear monoamine is 0.16 to 2.1, when the two kinds of linear monoamine are the primary linear monoamine having the low steric hindrance and the primary linear monoamine having the high steric hindrance, a weight ratio of the primary linear monoamine having the high steric hindrance to the primary linear monoamine having the low steric hindrance is between 0.3 to 2.5, when the two kinds of linear monoamine are the secondary linear monoamine and the tertiary linear monoamine, a weight ratio of the tertiary linear monoamine to the secondary linear monoamine is between 0.3 to 2.5, when the two kinds of linear monoamine are the primary linear monoamine having the high steric hindrance and the secondary linear monoamine, a weight ratio of the primary linear monoamine having the high steric hindrance to the secondary linear monoamine is between 0.3 to 2.5, and when the two kinds of linear monoamine are the primary linear monoamine having the high steric hindrance and the tertiary linear monoamine, a weight ratio of the primary linear monoamine having the high steric hindrance to the tertiary linear monoamine is between 0.3 to 2.5.

2. The composite amine absorbing solution according to claim 1, wherein the diamine includes at least one of a primary linear polyamine, a secondary linear polyamine, and a cyclic polyamine.

3. The composite amine absorbing solution according to claim 1, wherein a total concentration of the two kinds of linear monoamine and the diamine is 40% to 60% by weight of the entire absorbing solution.

4. The composite amine absorbing solution according to claim 1, wherein a blending ratio between the diamine and the amide group-containing compound is 1:0.4 to 1:54.

5. A device for removing $CO_2$ or $H_2S$ or both, the device comprising:

an absorption tower that brings a gas containing $CO_2$ or $H_2S$ or both and an absorbing solution into contact with each other to remove $CO_2$ or $H_2S$ or both; and an absorbing solution regeneration tower that regenerates a solution that has absorbed $CO_2$ or $H_2S$ or both, wherein a solution regenerated by removing $CO_2$ or $H_2S$ or both in the absorbing solution regeneration tower is reused in the absorption tower, and the composite amine absorbing solution according to claim 1 is used.

6. The device for removing $CO_2$ or $H_2S$ or both according to claim 5, wherein an absorbing temperature in the absorption tower is 30° C. to 80° C., and a regeneration temperature in the absorbing solution regeneration tower is 110° C. or higher.

7. A method for removing $CO_2$ or $H_2S$ or both, the method comprising:

bringing a gas containing $CO_2$ or $H_2S$ or both and an absorbing solution into contact with each other to remove $CO_2$ or $H_2S$ or both in an absorption tower;

regenerating a solution that has absorbed $CO_2$ or $H_2S$ or both in an absorbing solution regeneration tower; and reusing a solution regenerated by removing $CO_2$ or $H_2S$ or both in the absorbing solution regeneration tower, in the absorption tower, wherein $CO_2$ or $H_2S$ or both is removed using the composite amine absorbing solution according to claim 1.

8. The method for removing $CO_2$ or $H_2S$ or both according to claim 7, wherein an absorbing temperature in the absorption tower is 30° C. to 80° C., and a regeneration temperature in the absorbing solution regeneration tower is 110° C. or higher.

* * * * *